US008134455B2

(12) United States Patent
Flick et al.

(10) Patent No.: US 8,134,455 B2
(45) Date of Patent: Mar. 13, 2012

(54) METHOD FOR SENDING AN EMERGENCY CALL AND DEVICE

(75) Inventors: Bernd Flick, Diekholzen (DE); Lars Placke, Hannover (DE); Holger Modler, Hildesheim (DE); Achim Dahlhoff, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 695 days.

(21) Appl. No.: 11/794,019

(22) PCT Filed: Nov. 18, 2005

(86) PCT No.: PCT/EP2005/056075

§ 371 (c)(1), (2), (4) Date: Jan. 13, 2009

(87) PCT Pub. No.: WO2006/067008

PCT Pub. Date: Jun. 29, 2006

(65) Prior Publication Data

US 2009/0207007 A1 Aug. 20, 2009

(30) Foreign Application Priority Data

Dec. 21, 2004 (DE) ........................ 10 2004 061 399

(51) Int. Cl.
*B60Q 1/00* (2006.01)

(52) U.S. Cl. ................. 340/436; 340/539.22; 455/404.1

(58) Field of Classification Search .................. 340/436, 340/539.13, 539.18, 539.22, 440; 455/404.1, 455/404.2

See application file for complete search history.

(56) References Cited

U.S. PATENT DOCUMENTS

| | | | | |
|---|---|---|---|---|
| 2002/0041240 | A1 | 4/2002 | Ikeda et al. | |
| 2002/0115423 | A1 * | 8/2002 | Hatae et al. | 455/404 |
| 2003/0016147 | A1 | 1/2003 | Evans | |

FOREIGN PATENT DOCUMENTS

| | | |
|---|---|---|
| DE | 43 21 416 | 1/1995 |
| DE | 102 40 830 | 1/2004 |
| DE | 10 2004 059713 | 7/2005 |
| EP | 1 233 387 | 8/2002 |
| EP | 1 280 120 | 1/2003 |
| JP | 2001-43469 | 2/2001 |
| KR | 2003-0008655 | 1/2003 |

* cited by examiner

*Primary Examiner* — Thomas Mullen
(74) *Attorney, Agent, or Firm* — Kenyon & Kenyon LLP

(57) ABSTRACT

For sending an emergency call as a function of a predefined accident criterion, together with the emergency call, dynamic sensor data are transmitted which have been recorded in particular shortly before the occurrence of an accident criterion and which allow conclusions to be drawn about the accident situation.

10 Claims, 1 Drawing Sheet

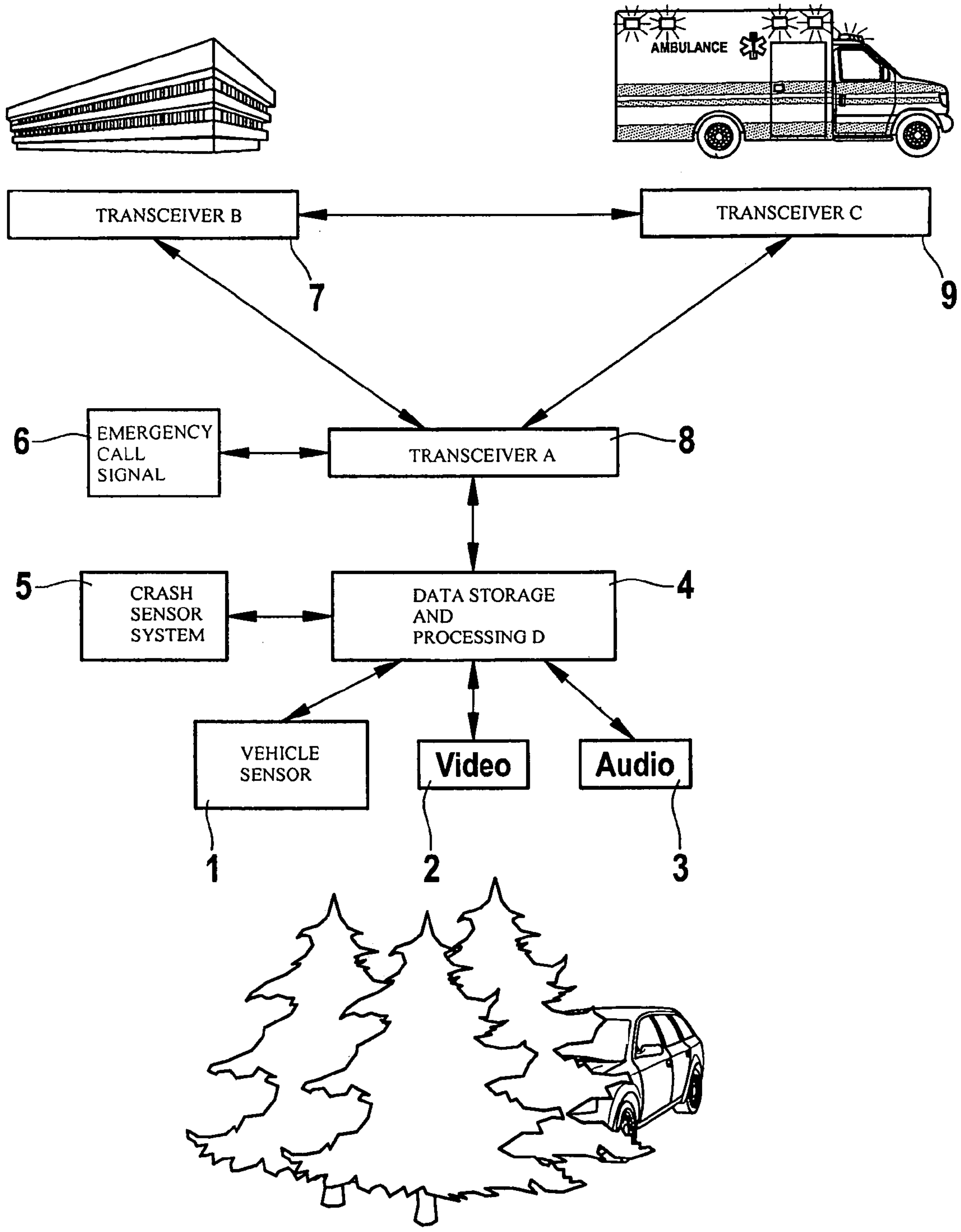
AMBULANCE
TRANSCEIVER B
TRANSCEIVER C
7
9
6
EMERGENCY CALL SIGNAL
TRANSCEIVER A
8
5
CRASH SENSOR SYSTEM
DATA STORAGE AND PROCESSING D
4
VEHICLE SENSOR
Video
Audio
1
2
3

METHOD FOR SENDING AN EMERGENCY CALL AND DEVICE

FIELD OF THE INVENTION

The present invention relates to a method for sending an emergency call as a function of a predefined accident criterion.

BACKGROUND INFORMATION

A device for such a method is known from German Patent Application No. DE 102 40 830, where an emergency call is emitted as a function of the response of a crash sensor. A similar system is known from German Patent Application No. DE 43 21 416, where position data are transmitted together with the emergency call.

SUMMARY OF THE INVENTION

According to the present invention, together with the emergency call, dynamic sensor data are transmitted which have been recorded in particular shortly before and/or after the occurrence of an accident criterion and which allow conclusions to be drawn about the accident situation. This makes it possible for the rescue teams to receive a clear picture about the situation at the place of the accident, the severity of the accident, or other important information. For example, special rescue equipment may be called in earlier.

Surveys of rescue teams revealed that a fundamental problem for them is that, as a rule, they only have an inadequate picture of the on-site situation upon arrival at the place of the accident. The reason for this is that, on the one hand, the rescue teams receive information from the place of the accident only via third parties and, on the other hand, they often have no accurate information about the circumstances of the accident. Modern vehicles, in particular by taking into account further technical innovations around the vehicle, have a number of vehicle sensors which permanently generate a large amount of information. Sensors for measuring acceleration (longitudinal and transversal), velocity, rollover, heat, video, fuel tank content, occupancy, pressure and impact forces, etc., should be noted as examples in this connection. For example, information about the driving situation prior to the accident may be derived from these data (How fast was the vehicle traveling? How much was it accelerated at the time of the accident?). Similarly, it may be derived whether the vehicle is burning, whether fuel is leaking, whether the doors or the body are greatly deformed, how many occupants are/were in the vehicle, or in which position the vehicle is standing or laying.

Previous systems evaluate sensor information only as to whether an accident has actually happened which triggers an unspecified emergency call. Position data or static data are transmitted at best from which conclusions as to an actual accident situation and its extent can hardly be drawn.

The present invention may resort to sensors already installed in the motor vehicle. It is simply necessary that the relevant dynamic sensor data, which are mostly transmitted to a central control unit via the vehicle bus anyway, are continuously additionally stored for a predefined period of time. A simple memory having a limited capacity and a storage time of, for example, a few seconds to one minute is sufficient. The dynamic sensor data may advantageously be transmitted to and displayed in a control center from where individual users, e.g., emergency teams, may be called up. The sensor data may also be transmitted directly to the individual users. The dynamic sensor data may be processed prior to transmission, i.e., in particular linked and/or correlated to reduce redundancy or to run plausibility checks. The data may also be compressed chronologically and transmitted in a standardized protocol, according to the GSM or UMTS standard, for example. Transmitting devices, which are already present or are carried in the vehicle, may be used in this case.

Victim questioning or victim monitoring may be made possible via an automatic or, for example, a voice and/or video connection to be activated by an emergency call center. Monitoring or rescue teams may get a direct and comprehensive picture of the situation in and around the vehicle via video interior and/or exterior sensors, and may coordinate and control actions.

BRIEF DESCRIPTION OF THE DRAWING

FIG. 1 shows a block diagram with possible transmission paths.

DETAILED DESCRIPTION

The relevant data from vehicle sensors 1 (state sensors such as airbag sensor, radar sensor, door lock sensor, tank sensor, acceleration sensor, velocity sensor, temperature sensor, etc.), 2 (video sensors), and 3 (audio sensors) are continuously recorded and saved by a special memory 4 for a certain predefined time, one minute for example. This memory may be protected, for example, against physical forces as well as against power failure. In the event of an accident situation, i.e., when crash sensor 5 responds, the dynamic sensor data recorded immediately before in connection with the emergency call signal, which is generated in unit 6, are transmitted to emergency call center 7 via a transmitting unit 8 (transmitter A to receiver B). Alternatively, the data may also be transmitted directly to an emergency vehicle 9 (transmitter A to receiver C). If needed, the data may be processed (D) beforehand in a suitable manner via an analyzing and linking unit assigned to memory 4. Alternatively, a suitable data connection may be established between the vehicle and an external location via which the relevant data may be called up (modules A, B, and C are to be understood as transceivers in this case). It is also possible to use such a connection for transmitting live images from the passenger compartment and the vehicle surroundings via the available video sensors. Likewise, a voice connection between the accident vehicle and the call center or the rescue teams may be activated. This activation may take place automatically or by request by call center 7 or the rescue teams.

In one embodiment of the present invention, a data connection to an emergency call center, a rescue center, or a rescue vehicle may automatically be established following an accident. Information about the velocity at the time of the accident, acceleration values during the accident, the vehicle's position from the roll-over sensor, and other relevant information as described earlier are transmitted via this data connection. The rescue teams are able to get a general idea early about the accident situation and thus about the likely situation at the place of the accident. A data connection to an emergency call center, a rescue center and, if needed, also to a rescue vehicle is automatically established following an accident. This data connection is used for transmitting video data (utilization of the video sensors in the vehicle) which may display the passenger compartment as well as the surroundings. Due to these data, the rescue teams are able to directly analyze the on-site situation and can better prepare for the rescue operation. For example, special rescue equipment may be requested earlier.

Similarly to the video connection, an audio connection may also be established in order to carry out victim questioning or victim care even when a victim is no longer able to reach or activate control elements.

What is claimed is:

1. A method for automatically sending an emergency call from a monitored vehicle in response to a crash defined by an impact on the body of the monitored vehicle caused by contact between the body of the monitored vehicle and at least one of another object and ground, comprising:

automatically transmitting, together with the emergency call, dynamic sensor data of the monitored vehicle which have been recorded at least one of shortly before and after an occurrence of the crash, wherein the dynamic sensor data of the vehicle include at least one of (i) transverse acceleration data of the vehicle, (ii) output data from a sensor configured to detect a roll-over condition of the vehicle, and (iii) output data from a heat sensor.

2. The method according to claim 1, wherein the dynamic sensor data are transmitted together with the emergency call directly to at least a rescue team.

3. The method according to claim 1, further comprising:

processing, prior to transmission, the dynamic sensor data by at least one of linking and correlating of selected individual elements of the dynamic sensor data with selected other individual elements of the dynamic sensor data.

4. The method according to claim 1, wherein transmission of the dynamic sensor data activates at least one of an audio and video connection.

5. The method according to claim 1, wherein the dynamic sensor data are picked up and stored by sensors which are situated in a motor vehicle.

6. A device for automatically sending an emergency call from a monitored vehicle in response to a crash involving the monitored vehicle, comprising:

a crash sensor configured to detect a crash defined by an impact on the body of the monitored vehicle caused by contact between the body of the monitored vehicle and at least one of (i) another object and (ii) ground;

at least one sensor configured to detect, at least one of shortly before and after an occurrence of the crash, at least one of (i) transverse acceleration of the vehicle, (ii) a roll-over condition of the vehicle, and (iii) heat level in the vehicle;

a memory for dynamically storing output data from the at least one sensor; and a transmitting device for sending an emergency call together with the output data from the at least one sensor stored in the memory when the crash sensor detects the crash.

7. The device according to claim 6, further comprising means for at least one of linking and correlating selected individual elements of the stored output data from the at least one sensor with selected other individual elements of the stored output data from the at least one sensor.

8. The device according to claim 6, further comprising means for retrieving the stored data of the at least one sensor.

9. The device according to claim 6, further comprising means for automatically activating at least one of an audio and video connection between the monitored vehicle and at least a rescue team when the crash sensor detects the crash.

10. A method for automatically sending an emergency call from a monitored vehicle in response to a crash defined by an impact on the body of the monitored vehicle caused by contact between the body of the monitored vehicle and at least one of another object and ground, comprising:

automatically transmitting, together with the emergency call, dynamic sensor data of the monitored vehicle which have been recorded at least one of shortly before and after an occurrence of the crash, wherein the dynamic sensor data of the vehicle include at least one of (i) transverse acceleration data of the vehicle, (ii) output data from a sensor configured to detect a roll-over condition of the vehicle, and (iii) output data from a heat sensor;

wherein transmission of the dynamic sensor data activates an audio connection to enable questioning of an occupant of the vehicle.

* * * * *